Feb. 21, 1967     L. H. CHANOCH     3,305,616

METHOD OF MAKING A MINIATURE RUBBER TIRED WHEEL

Filed May 13, 1963

INVENTOR:
LAWRENCE H. CHANOCH
BY
*Watson D Harbaugh*
ATT'YS

United States Patent Office 3,305,616
Patented Feb. 21, 1967

3,305,616
METHOD OF MAKING A MINIATURE RUBBER TIRED WHEEL
Lawrence H. Chanoch, Skokie, Ill., assignor to Webcor, Inc., Chicago, Ill., a corporation of Illinois
Filed May 13, 1963, Ser. No. 280,063
6 Claims. (Cl. 264—157)

This invention relates to a method for making a composite wheel and more particularly in providing a method for making a small and narrow wheel with a resilient tire on the rim face thereof with its tread having a width no wider than the thickness of the wheel.

Heretofore, it has been with great difficulty and expense that resilient tires have been secured to the rim face of a metal wheel built to be contacted by a hard surface small cylindrical roller to either drive or be driven thereby. The resulting cost of the product has been correspondingly high. This was particularly true where the depth of the resilient tire is to be uniform for widths and depths in small fractions of an inch, such as 1/32" to 3/32", as for transmission use in miniature tape recorders. Not only has the width varied, but the tire depth and concentricity have been unsatisfactory for applications involving the reproduction of sound.

Accordingly, it is one of the objects of the present invention to provide a method for making inexpensive miniature rubber tired wheels of high uniformity within close tolerances irrespective of mold dimensions for multiple uses in different diameters against hard surface rollers including rubber tires on the circular tape reel side flanges themselves.

A further object of the invention is to provide a method for making inexpensive rubber tired wheels of uniform tread compression throughout their width for high ratios of speed reduction and for the transmission of tape by the reels past a play-record head without audible cycle flutter or pitch changes.

A further object of the invention is to provide a method for making rubber tired wheels for a silent running multiple roller-to-wheel direct contact frictional drive train which transmits power through a rubber tire at each contact and thereby conserves space and expense by eliminating the need of drive belts and gears when recording or playing back a tape moved thereby across a play-record head from one reel to another by a drive direct to the reels themselves.

A further object of the invention is to provide a method for making an improved tape transport reel to be driven in either direction in positive frictional direct contact relationship with a small diameter hard surface roller.

Another object of the invention is to provide a process for bonding rubber tires on the rims of many wheels as an integrated unit for processing as a unit, after which the wheels virtually fall apart into free separate units with no strain of separation placed upon them or upon the tires bonded thereto, and further, the forms can be reintegrated and used repeatedly.

"Rubber" as used herein includes other elastomer materials such as neoprene.

These being among the objects of the invention other and further objects will become apparent from the following description and the drawings relating thereto in which.

Figure 1:
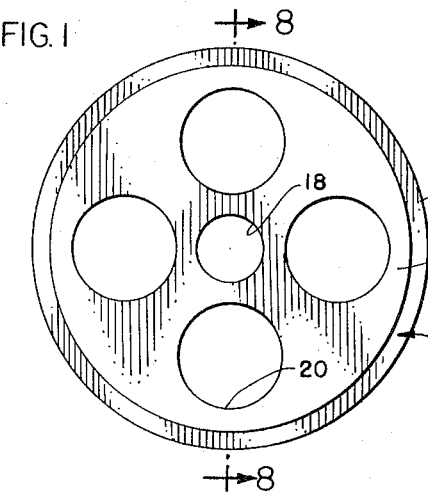
FIG. 1 is a side elevation of the finished product of the process embodying the invention.
Figure 5:
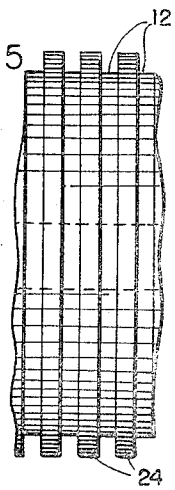
Figure 6:
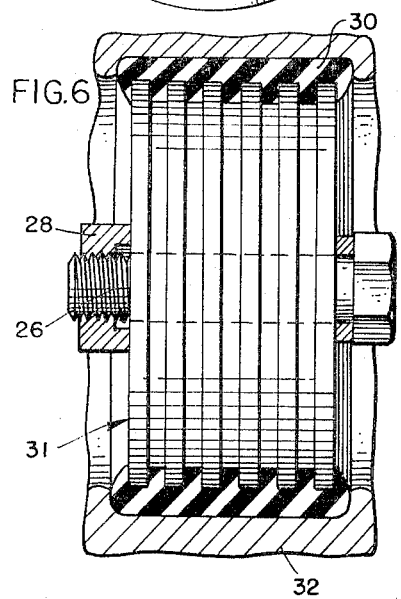
Figure 7:
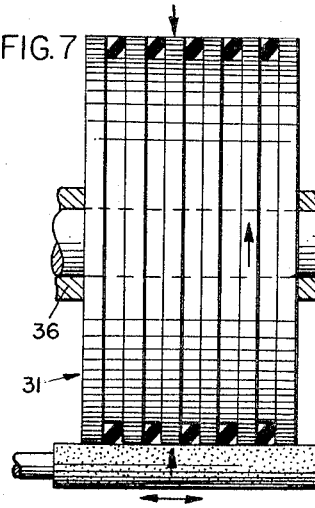
Figure 8:
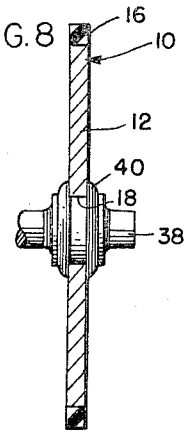

FIG. 5 as a fragmentary showing of assembled central portions and spacer blanks;

FIG. 6 is a side elevation of the assembled central portions and spacer blanks as they are during vulcanization;

FIG. 7 illustrates one of the steps of the process by which the tires are made completely uniform; and FIG. 8 is an edge view of the wheel shown in FIG. 1, partly in section, as mounted upon a supporting hub.

Briefly stated, the invention contemplates alternating circular metal wheel portions with spacers of larger diameter. The rim faces of the wheel members are treated with a rubber bonding material while the spacers are treated all over with a bond repelling material. Unvulcanized sheet rubber of a desired consistency is wrapped around the assembly and the assembly placed in a vulcanizing mold. Vulcanizing flows the rubber against the rims where it bonds and leaves surplus beyond the edges of the spacers. The rubber does not bond to the spacers but the assembly is mechanically held in a unitized form for subsequent handling. The surplus rubber is then sanded off to the edges of the spacers whereupon the spacers and rubber tired wheels are easily separated, the spacers being treated again for repeated use. The rubber tired wheels are ready for mounting on hubs either as a single driven wheel in a speed reduction transmission or as the sides of a tape reel where each driven alternately as the reel is turned over for reversing the movement of magnetic tape between the reels.

Figure 2:
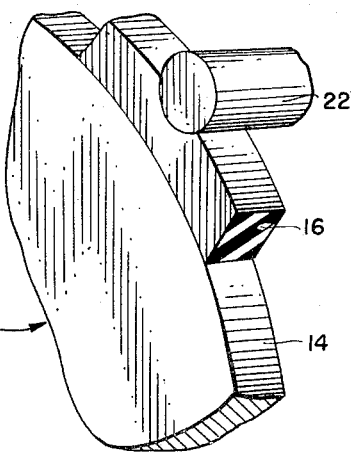
FIG. 2 is an enlarged perspective fragmentary view showing how the product is used with a roller drive.
Figure 3:
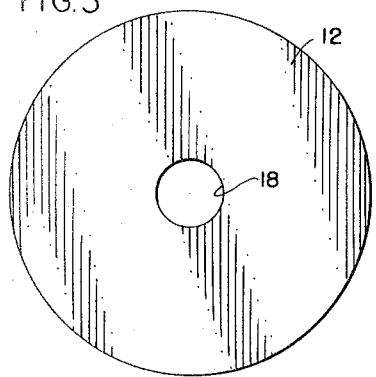
FIG. 3 is a side elevation of the metal central positions of the wheels before being tired.
Figure 4:
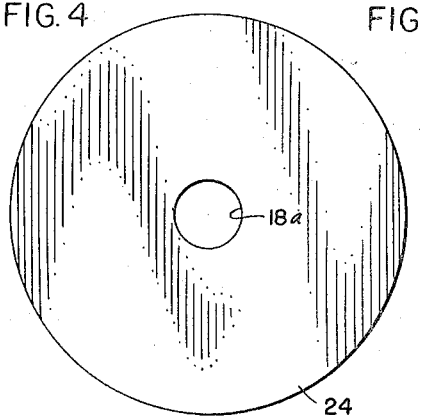
FIG. 4 is a side elevation of spacer blanks used in the process.

A finished wheel is shown at 10 in FIGS. 1, 2 and 8 comprising a central portion sheet metal element 12 approximately 1/16" thick having an edge face 14 defining a cylindrical surface of revolution with a rubber tire 16 bonded thereto. The element 12 is apertured axially at 18 to receive a hub 40 (FIG. 8) in press fitted or flange supported relationship but the aperture 18 may be configured otherwise than circular to engage a correspondingly configured hub if desired. Also, the central portion can be provided with cut out openings 20 serving as windows as well as lightening the wheel, if desired. The free radius of the wheel is measured with the rubber tire uncompressed by a roller such as shown at 22 engaging it. (FIG. 2) The rolling radius is that imposed upon the tire by compression of the tire by the roller.

Metal spacers 24 are provided having a radius equal to said free radius of the wheel 10. They also have central aperture 18a identical in configuration with the aperture 18. The untired wheel elements 12 are then sandwiched between the spacers 24 as shown in FIG. 5 in an assembly with spacers at both ends, and, as shown in FIG. 6, an arbor 26 is inserted and the assembled elements clamped together by a nut 28 to form a unit 31.

Thereafter a sheet or sleeve of unvulcanized rubber 30 is wrapped around the assembly and a plurality of vulcanizing elements or molds 32 apply radial pressure to the rubber along with vulcanizing heat. The rubber flows radially between the spacers and into bonding contact with the edges 14 of the wheel elements 12.

The vulcanizing elements 32 are removed and also the arbor 26. The vulcanized rubber then maintains the spacers 24 and wheel elements 12 in a unitary assembly 31 for ease of subsequent handling. After cooling and inspection a rotatable arbor 34 is inserted with lathe clamps 36 to hold the spacers and wheel elements in clamped relation on a lathe spindle. The assembly 31 is then rotated at a low speed and a coarse sanding drum 37 is reciprocated longitudinally for a full leveling effect and simultaneously fed radially to remove the surplus rubber as shown in FIG. 7 down almost to the edges of the spacers. When the edges of the spacers begin to be cleared of non-bonded rubber the exposed surfaces of the rubber on the wheels 12 can be fine sanded to a finish even with the edges of the spacers. The arbor 34 is then removed whereupon the wheels and spacers can be finger separated. However, it is preferred to remove the spacers and reassemble the wheels for the final finishing of the treads. Thereafter, the wheels each can then be mounted on a suitable hub 38 in a suitable manner. Flanges 40 are merely representative of one of a number of mountings.

In the process it is to be noted that before the assembly is made up as shown in FIG. 5, the elements are first thoroughly surface cleaned and dried; the spacers 24 and the mold elements are then surface treated with a mold lubricant or bond preventing material while the wheels' elements 12 particularly their rim faces 14 are treated with a bonding material.

By way of example, but not by way of limitation, a suitable mold lubricant may be made by reacting steric acid, zinc oxide, oleic acid, and aqua ammonia in a reaction vessel. The zinc oxide should be present in slight excess in the reacting mixture so that there will be some free zinc oxide remaining in the products of the reaction. The mold lubricant is made into a dispersion by adding water and heating. A convenient way of making the lubricant is to mix 4 lbs. of a wetting agent, such as sodium lauryl sulfate, 77 pounds of stearic acid flakes, preferably melted, 22 pounds of zinc oxide, 92 pounds of oleic acid, 65 pounds of 29% aqua ammonia, and 558 pounds of water, in a steam-jacketed power-driven churn. The contents are heated with steam at 225° F. The contents of the churn are agitated at the above temperature until a smooth paste of uniform consistency is obtained. This recipe makes about 100 gallons or 818 pounds of the paste and this paste should be dispersed in an equal volume of water to render it sufficiently fluid to be easily applied to the spacers and mold surfaces.

Also by way of example but not by way of limitation, a thin adherent coating may be applied to the rim surface 14 of the wheel 12 comprising a mixture of rubber and synthetic drying oil of divinyl-acetylene or mono-vinyl-acetylene or their homologs; drying the adherent coating; and, then applying a film of viscous cement made of rubber and a volatile solvent.

After assembly, the vulcanizable rubber 30 is wrapped in place as already described and subjected to pressure and vulcanizing heat, reference being made to the Humphrey Patent No. 2,144,495 for further details regarding the bonding materials and their function.

It is to be noted that the depth of the tire 16 is uniform in relation to the contour of the roller 22. The roller being cylindrical, the internal and external contours of the tire portion 16 and also the rim face 14 are also cylindrical. Thus, the tire has a uniform compression at its running radius as where there is a predetermined fixed distance or interference compression factor between the axes of the roller 20 and wheels 10. Then there is no unevenness of wear, nor do any irregularities develop which would vary the exact speed reduction ratio between the roller and wheel. Moreover, with the predetermined fixed distance between axes the compression on the rubber tire can be maintained constant within the optimum working resiliency as related to the size or curve of the roller 22. Preferably against a high speed roller, the durometer of the rubber is approximately 50 and with a low speed roller as against a reel rim the durometer can be as much as 90.

Having thus described the invention and the desirable characteristics and advantages thereof, it will be apparent to those skilled in the art that various and further changes can be made within the stated objects without departing from the spirit of the invention, the scope of which is commensurate with the appended claims.

What is claimed is:

1. The method of manufacturing a composite wheel which comprises clamping the wheel of a given diameter between and concentrically with two circular mold plate spacers having equal diameters greater than the diameter of the wheel to create a peripheral wheel cavity above the rim face of the wheel, placing an unvulcanized rubber sleeve about the spacers and wheel applying vulcanizing heat and pressure to the sleeve to force a portion of said sleeve to fill the wheel cavity with rubber, to vulcanize said rubber and to bond the rubber to said rim face, and removing said spacers.

2. The invention according to claim 1 wherein the mold plate spacers are pretreated with a mold release and the peripheral surface of the wheel is pretreated to increase bonding affinity to rubber.

3. The method of manufacturing a composite wheel which comprises clamping a wheel of a given diameter between and concentrically with two circular mold plate spacers having equal diameters greater than the diameter of the wheel to create a peripheral wheel cavity, placing a rubber sleeve about the spacers and wheel, applying heat and pressure to the sleeve to force a portion of the sleeve into the cavity and to vulcanize the rubber, removing the excess sleeve material remaining beyond the diameter of the spacers, and unclamping and removing the spacers from the finished composite wheel.

4. The invention according to claim 3 wherein the mold plate spacers are pretreated with a mold release and the peripheral rim face of the wheel is pretreated to increase bonding affinity to rubber.

5. The method of simultaneously manufacturing a plurality of composite wheels which comprises clamping a plurality of wheels of equal diameter in a stacked concentric arrangement with a plurality of mold plates, there being a mold plate on either side of each wheel in the stack, said mold plates being of equal diameter greater than the diameter of the wheels to create a plurality of peripheral wheel cavities, placing an unvulcanized rubber sleeve over said stacked arrangement, applying heat and pressure to the sleeve to flow portions of the sleeve into said wheel cavities to fill the same and to vulcanize the rubber in the cavities, grinding away any excess material extending beyond the peripheral edges of the mold plates, and unclamping the stacked arrangement to permit separation of the plurality of completed composite wheels.

6. The invention according to claim 5 wherein the mold plate spacers are pretreated with a mold release and the peripheral surfaces of the wheels are pretreated to increase the bonding affinity thereof to rubber.

References Cited by the Examiner

UNITED STATES PATENTS

| 25,560 | 3/1864 | Gifford | 264—264 |
|---|---|---|---|
| 1,092,129 | 3/1914 | Spencer | 264—326 |
| 1,576,874 | 3/1926 | Stevens | 156—293 |
| 2,025,993 | 12/1935 | Laursen | 264—326 |
| 2,144,495 | 1/1939 | Humphrey | 161—217 |
| 2,395,300 | 2/1946 | Slauson | 264—277 |
| 2,703,437 | 3/1955 | Lindblad | 264—278 |
| 2,956,848 | 10/1960 | St. Clair | 264—259 |
| 3,202,749 | 8/1965 | White | 18 |

ROBERT F. WHITE, *Primary Examiner.*

S. A. HELLER, *Assistant Examiner.*